United States Patent [19]

Kirby

[11] 4,381,044

[45] Apr. 26, 1983

[54] MULTIPLE CHAMBERED GAS POWERED SEISMIC SOURCE

[75] Inventor: Robert A. Kirby, Houston, Tex.

[73] Assignee: Exxon Production Research Co., Houston, Tex.

[21] Appl. No.: 194,487

[22] Filed: Oct. 6, 1980

[51] Int. Cl.³ .................. G01V 1/137; G01V 1/38
[52] U.S. Cl. .................................. 181/118; 181/120; 367/144
[58] Field of Search ............... 367/144; 181/106, 110, 181/111, 118, 120

[56] References Cited

U.S. PATENT DOCUMENTS

| 3,246,289 | 4/1966 | Miller | 181/120 |
| 3,276,534 | 10/1966 | Ewing et al. | 181/120 |
| 3,638,752 | 2/1972 | Wanefield | 367/144 |
| 3,919,684 | 11/1975 | Reed | 181/118 |
| 4,016,952 | 4/1977 | Reed et al. | 181/110 |
| 4,211,300 | 7/1980 | Miller | 181/120 |
| 4,219,098 | 8/1980 | Thomson et al. | 181/120 |
| 4,230,201 | 10/1980 | Bays | 181/118 |
| 4,246,979 | 1/1981 | Thomson et al. | 367/144 |

*Primary Examiner*—Nelson Moskowitz
*Attorney, Agent, or Firm*—E. T. Wheelock

[57] ABSTRACT

A compressed-gas seismic energy source suitable for underwater prospecting. The device has two gas storage cylinders placed at the opposite ends of a shuttle. The shuttle seals both storage cylinders when seated at the end of its stroke and releases gas for the desired sonic pulse from both cylinders during its stroke. Design of the device provides for simplicity of operation, ready modification of the sonic signature, and reliability of moving parts.

19 Claims, 2 Drawing Figures

MULTIPLE CHAMBERED GAS POWERED SEISMIC SOURCE

BACKGROUND OF THE INVENTION

This invention relates to an improved seismic energy source used to create pulses or shock waves in a liquid medium such as water. More particularly, it relates to a simple gas-powered apparatus which is easily operated, more reliable than those of the prior art, and whose signature and frequency spectrum can easily be modified.

In prospecting in subsea and other areas underlying a body of water, it is desirable to provide a source of energy for propagating sonic pulses or shock waves into the water. Since water is a good conductor of sound, it normally is not necessary to generate pulses near the floor of the waterbody; they can be, and desirably are, produced near the water's surface. These pulses propagate down through the water, across the waterfloor interface, into the subfloor geologic formations and are, to some extent, reflected back across the same path to an array of geophones, or like equipment, waiting near the surface of the water. Analysis of the signals produced by the geophones can provide some instruction concerning the structure of the subfloor geological formation and attendant petroleum accumulation in those formations.

The term "water" as used herein is meant to include swampwater, mud, marshwater and any other liquid containing sufficient water to enable operation of the invention.

There are many ways of generating a sonic pulse in a liquid. For instance, explosives introduce strong pulses into the water and accordingly achieve substantial penetration into subfloor formations. Certain obvious drawbacks exist in their use: they are dangerous to store, handle, and use. When used in open water they kill marine life. In crowded areas such as harbors, explosives cannot be used at all. Explosives are orders of magnitude more expensive to use, on a per-shot basis, than are gas guns. Modification of the explosive source's sonic signature to achieve an acceptable spectrum distribution is difficult.

Another method of generating a sonic pulse is by discharge of a bank of capacitors through a subsurface electrode to produce a quickly collapsing gaseous bubble. However, the efficiency of this method is quite low in that only a few percent of the energy charged to the capacitors is found in the shock wave produced on discharge.

Apparatus using explosive gas mixtures, e.g., propane and air, to produce the sonic pulse have gained wide acceptance. The two major types of explosive gas guns are those which operate by exploding a gas mixture behind a flexible membrane which in turn is in contact with the water and those which operate by allowing the abrupt bubble from the gas explosion to pass directly into the water. An example of the former apparatus can be found in U.S. Pat. No. 3,658,149; an example of the latter can be found in U.S. Pat. No. 4,193,472.

Open guns using high pressure compressed gases, instead of an explosive mixture, have achieved a wide acceptance in the industry. Typical designs for open-ported compressed gas guns are found in U.S. Pat. No. 3,653,460 to Chelminski and U.S. Pat. No. 4,141,431 to Baird. These guns employ two pressurized chambers, i.e., a control chamber and a gas holding chamber, which are sealed by a spool-shaped valve or shuttle. The gun is fired by abruptly releasing gas from the control chamber. The gas in the gasholding chamber forces the shuttle into the control chamber thereby simultaneously exposing exhaust ports. These ports allow the gas stored in the gas holding chamber to explosively exit into the water. The control chamber is then re-pressurized, thereby moving the shuttle back into a position sealing the gasholding chamber. The gun is again ready to "fire".

Guns employing this design have certain liabilities which are quite difficult to correct. The period during which the exhaust ports are open after escape of the initial burst of gas is one in which no useful operation is performed. The initial burst of gas through the exhaust port is the one which produces the useful portion of the shock wave. Obviously the gas lost from the exhaust ports during the repositioning of the shuttle is wasted. The apparatus of the invention disclosed herein consumes a significantly smaller amount of compressed gas than do those of the prior art which have a shuttle which must reverse itself prior to firing. The mechanical stress on the shuttle of the invention is much less than on the reversing shuttle of the prior art.

A compressed gas gun eliminating several problems associated with prior guns is disclosed in U.S. Pat. No. 4,180,139. This patent discloses a gun having a single cylindrical gas chamber with central exhaust ports about its periphery. Inside the gas chamber resides a moveable shuttle also having ports about its center. When the shuttle is moved from one end of the gas chamber to the other end, via the action of an integrated actuator, the ports in the shuttle momentarily align with those in the gas chamber wall and allow an amount of compressed gas to escape. Once the shuttle reaches the other end, the gun is in position to "fire" again awaiting only the build-up of pressure in the gas chamber and actuating mechanism. Although this device has a number of advantages over those of the prior art, e.g., efficient compressed gas usage, the geometry of the device precludes any reasonably facile alteration in the frequency and spectrum distribution of the sonic pulse it produces. The two physical dimensions of the gun, i.e., exhuast port geometry and gas chamber size, defining the signature of the sonic pulse cannot be significantly changed.

In contrast, the present invention is designed not only to eliminate valving which must reverse itself prior to repressuring and firing, but also to provide a ready modification of the sonic signature should such be desired.

SUMMARY OF THE INVENTION

The inventive seismic source has two pressurized bottles or chambers mounted on opposite ends of the gun frame. The two chambers are simultaneously pressurized and explosively depressurized through the actions of a shuttle valve mounted in the gun frame. The shuttle is of a unique configuration in that it has six integral pistons. The middle two pistons form the control section of the shuttle. The space between these central pistons is maintained at some convenient pressure. A control gas stream is alternately directed against one or the other of the outside faces of the control pistons. This alternation causes the shuttle to move from one end of its stroke to the other. The other four pistons on the shuttle, two at each end, are configured so that they seal both pressurized chambers only when the shuttle is at either end of its stroke. The seismic pulse is produced during the shuttle's transit by the escape of pressurized gases from the momentarily uncovered chamber through specially provided exhaust ports.

This device is straightforward and reliable. It has few moving parts. Unlike the majority of gas guns disclosed in the prior art and actually used in the industry, this gun has a shuttle piston that does not reciprocate with each firing. The shuttle seals the pressure chambers at either end of its stroke. The device, via changeable pressure chambers and exhaust ports, is structured so that its sonic spectrum is easily modified.

DESCRIPTION OF THE PREFERRED EMBODIMENTS

Figure 1:
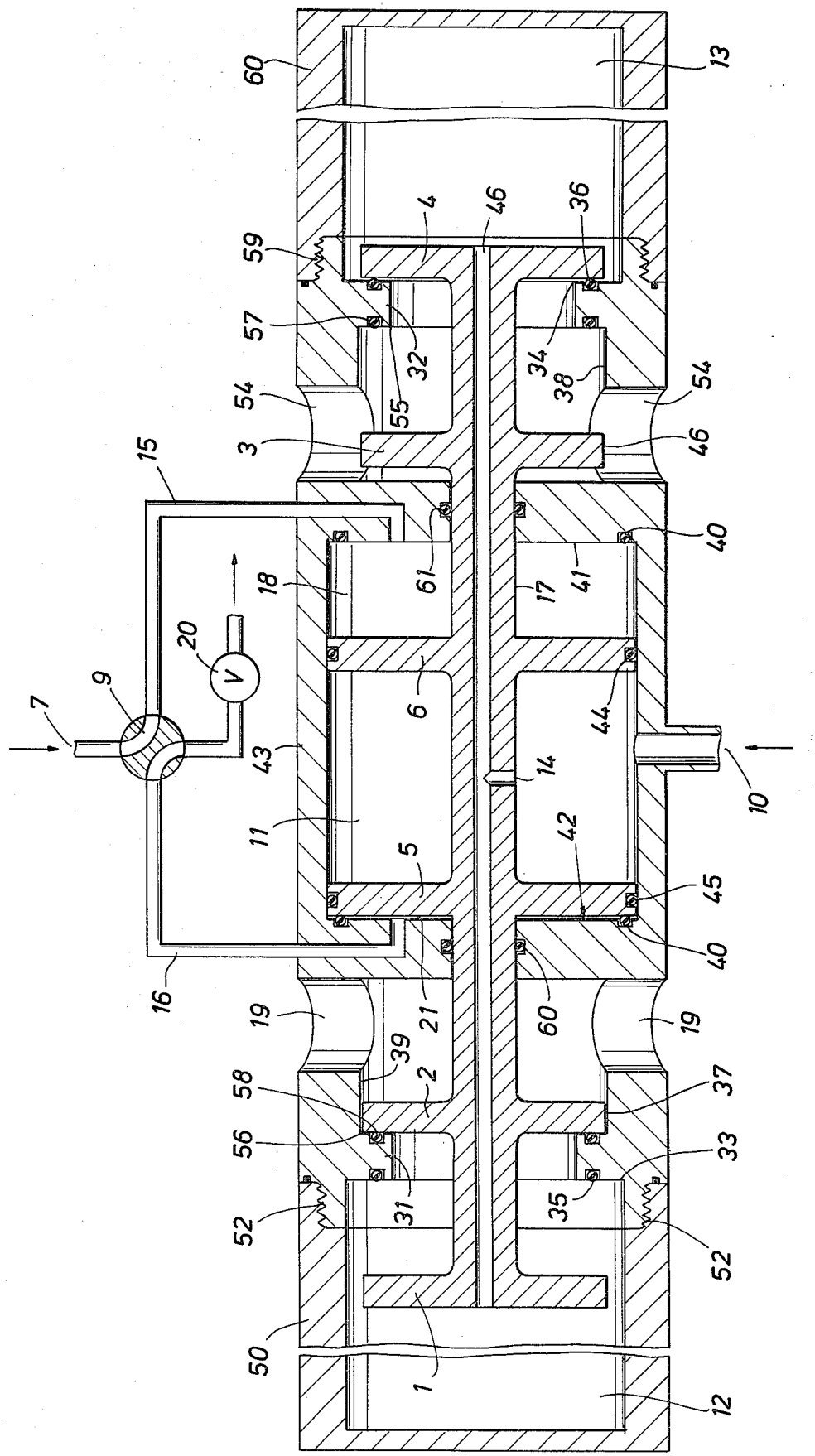
FIG. 1 is a schematicized cross-section of the inventive gas gun. The shuttle is shown at the left end of its stroke.

The preferred embodiment of the gas-powered seismic device has two gas chambers, mounted on opposite ends of the gun frame, to accumulate the pressurized gas used in producing the sonic pulse. The device has a shuttle, having six integral pistons, which moves back and forth within the gun frame in realizing its control and sealing functions. The middle two pistons control the shuttle's movement by the manual creation of pressure imbalances on those pistons. The outer four pistons have the single function of sealing the gas chambers when the shuttle is at either end of its stroke.

The control gas alternately applied to opposite ends of the control piston is manually switched using external valving. It is this switching which fires the device by allowing the shuttle to run its stroke and release the compressed gases contained in the gas chambers.

The shuttle 17 has a shaft with, for purposes of illustration, a first end and a second end. The terms "inner" and "outer" refer to directions toward or away from the midpoint of the shaft's longitudinal axis. The six pistons located on the shaft should be located symmetrically about the center of its longitudinal axis. The shuttle moves back and forth a distance known as the stroke. As noted above, the two middle pistons are control pistons whose function is to move the shuttle through its stroke in response to external manual manipulation. The four outer pistons operate only to seal the pressure chambers. The six pistons are arranged on the shaft in this manner: first outer sealing piston 1 and second outer sealing piston 4 are located at or near their respective ends of the shuttle. The inner face of first outer sealing piston 1 is intended to seat against seal 35 located in the outer sealing face 33 of the first shoulder 31. At the opposite end of the shuttle's stroke, the inner face of second outer sealing piston 4 seats against the seal 36 located in outer sealing face 34 of the shoulder 32. The inner faces of these outer sealing pistons may be prepared in any suitable manner. Circumferential grooves, ridges, combinations thereof, or merely a flat surface may be desirable depending upon the type of seals, discussed infra, employed in shoulders 31 and 32.

A first inner sealing piston 2 and second inner sealing piston 3 are located, respectively, so that their outer, or sealing, faces are a stroke length inside the inner sealing faces of their respective outer sealing pistons. These inner sealing pistons have outer sealing faces adapted to seat alternately on the inner sides or faces 56, 55 of shoulders 31 and 32. The inner sealing faces 56, 55 may have included therein seals 58, 57. Only one of the inner sealing pistons seats against an inner sealing face of shoulders 31 and 32 at anyone time. These pistons may have machined outer edges 37 and 46. The machined outer edges provide some dashpot action against the surfaces 39, 38 which are provided on the inside of the seismic source adjacent to shoulders 31 and 32.

The effective surface areas of each of first and second inner and outer sealing pistons should be essentially equal to each other. For instance, in FIG. 1, first inner sealing piston 2 is seated against seal 58 in shoulder 31 while outer sealing piston 4 is seated against seal 36 in shoulder 32. It is contemplated that the forces against these two pistons as a result of applied gas pressures be essentially balanced. This balancing can be effectuated by using "O" rings of the same diameter for seals 36 and 58. Similarly, seals 35 and 57 should be at the same diameter as those of 36 and 58. The pressures in volumes 11 and 18 (in gun frame 43) may be equal prior to firing since the same gas source, via the two different routes discussed infra, can feed both sides of control piston 6.

The remaining two pistons are first control piston 5 located toward the first end of the shaft and second control piston 6 located toward the other end of the shaft and inside their respective inner sealing pistons. The two control pistons may have outer sealing faces adapted in the same manner as the sealing faces of the inner and outer sealing pistons, to seat against seals 40, which can be resilient "O" rings, mounted in the end walls 42, 41 of the gun frame 43. The control pistons may optionally have seals 45, 44, e.g., metallic piston rings or "O" rings, in the edges of the pistons. In any event, the control pistons are both spaced an equal distance from the center of the shaft's longitudinal axis. To enhance controllability and response time it is desirable that the control pistons have larger effective surface areas than the sealing pistons.

If seals are placed in the end walls 42, 41 of the gun frame, the control pistons are spaced so that the outer sealing surfaces of those pistons are a stroke length apart. If the control pistons use only edge seals 45, 44 to perform their function, then any workable control piston spacing is permissible. Similarly at the other end of the shuttle's stroke, the pressures in volumes 11 and 21 are equal.

The shuttle has a gas passage 46 running the axial length of the shaft. An entry orifice 14, located between control piston 5 and 6 and communicating between gas passage 46 and the outside of the shaft, is also provided.

The seismic source also includes first and second gas storage assemblies or means. The first gas storage assembly has a first pressure chamber 50. It has a diameter larger than that of first outer sealing piston 1 and encloses a gas volume 12. The first pressure chamber 50 may be detachable, for instance, at a threaded joint 52. The first gas storage means also includes the first shoulder 31 with its outer sealing face 33, outer seal 35, inner sealing face 56 and inner seal 58. The passageway between the shoulder 31 and the shaft of shuttle 17 must be of sufficient size to allow ready escape of the gas stored in pressure chamber 50 upon firing.

The first gas storage assembly desirably may have a bore area 39 which closely fits the outer diameter of inner sealing piston 2, therefore providing some damping to the shuttle motion when inner sealing piston 2 approaches inner sealing face 56. The first gas exhaust ports 19 are found adjacent to bore area 39. The number and size of gas exhaust ports 19 are among the physical variables of the seismic source determining the frequency spectrum and signature of the sonic pulse. It is contemplated that the size of the exhaust ports in the invention be varied, for instance, by introduction of threaded inserts, drilled to proper port size, into sites provided for that purpose. It is not necessary, in the case of multiple exhaust ports, that each port be of the same size.

The second gas storage assembly is situated at the opposite end of the shuttle 17 from the first gas storage assembly and is made up of components having the same function as the similarly named components of the first gas storage means; i.e., second pressure chamber 60 having enclosed gas volume 13, threaded joint 59, bore area 38, exhaust ports 54, and shoulder 32 having outer sealing face 34, outer seal 36, inner sealing face 55 and inner seal 57.

The gun frame 43 functions as a control chamber and has holes at its opposite ends, adjacent to the first and second gas storage assembly, of such size as to allow axial movement of the shuttle shaft during the stroke. Seals 60, 61, which may be resilient "O" rings, can be incorporated in the hole to prevent the leakage of high pressure gas along the shuttle shaft into the exhaust port areas. Gun frame 43 has an inside diameter closely matched to the outside diameter of the first control piston 5 and the second control piston 6. Pressurized gas is introduced into the gun frame 43 in three ways. First, the gas ultimately charged into first and second pressure chambers 50, 60 via entry hole 14 and gas passage 46 is brought into the gun frame 43 through a gas charge inlet 10. The gas charge inlet 10 is desirably located in the approximate longitudinal axial center of the gun frame 43. Placement of the gas chamber inlet is critical only to the extent that it must remain between control piston 5, 6 at all times during the shuttle stroke thereby providing open passage of gas into both first and second pressure chambers 50, 60.

Control gas is introduced alternately through first control gas line 16 which openly terminates in first end 42 of the gun frame 43, and second control gas line 15, which openly terminates in the second end 41 of the gun frame 43.

In the embodiment illustrated in FIG. 1, the gun frame physically supports the first and second gas storage assemblies.

The valving necessary to switch control gas in inlet 7 from one control piston to the other can be quite simple. For purposes of describing the preferred embodiment, a fourway valve 9 is illustrated. Turning valve 9 will alternately direct gas coming from control gas inlet 7 through either control gas line 15 or control gas line 16. The valve 9 concurrently allows the control gas line which is not being used for control gas feed to be used to direct exhausting control gas through throttle valve 20. Throttle valve 20 allows, by proper adjustment, synchronization of the seismic source with others used in an array of seismic sources. The throttle valve 20 also allow some tuning of the seismic pulse signature via throttling of the control gas and by slowing the movement of the shuttle. This, in turn, changes the rate at which the gases in volumes 12, 13 escape through exhaust ports 19, 54.

Fourway valve 9 and throttling valve 20 are not a critical feature of this invention. Other valving arrangements, for example, ganged valves in combination with check-valve bleeders for each of control gas lines 15, 16 are contemplated to be within the scope of this invention.

In principle, the operation of the invention is quite simple. FIG. 1 illustrates the position of shuttle 17 between shots. High pressure gas, preferably air, is continuously fed into volume 11 through gas charge inlet 10. This gas additionally proceeds into volumes 12 and 13 through orifice 14 and gas passageway 46. Control gas, generally of the same pressure as that fed into gas change inlet 10, enters chamber 18 through control gas inlet 7, fourway valve 9, and control gas line 15. When the gas pressure in each of volumes 11, 12, 13, and 18 reaches the desired value, often that of the gas source, the gun is ready to fire. At that point, the gas in volume 18 holds the shuttle to left and, therefore, maintains sealing pistons 2 and 4 against their respective seals.

Figure 2:
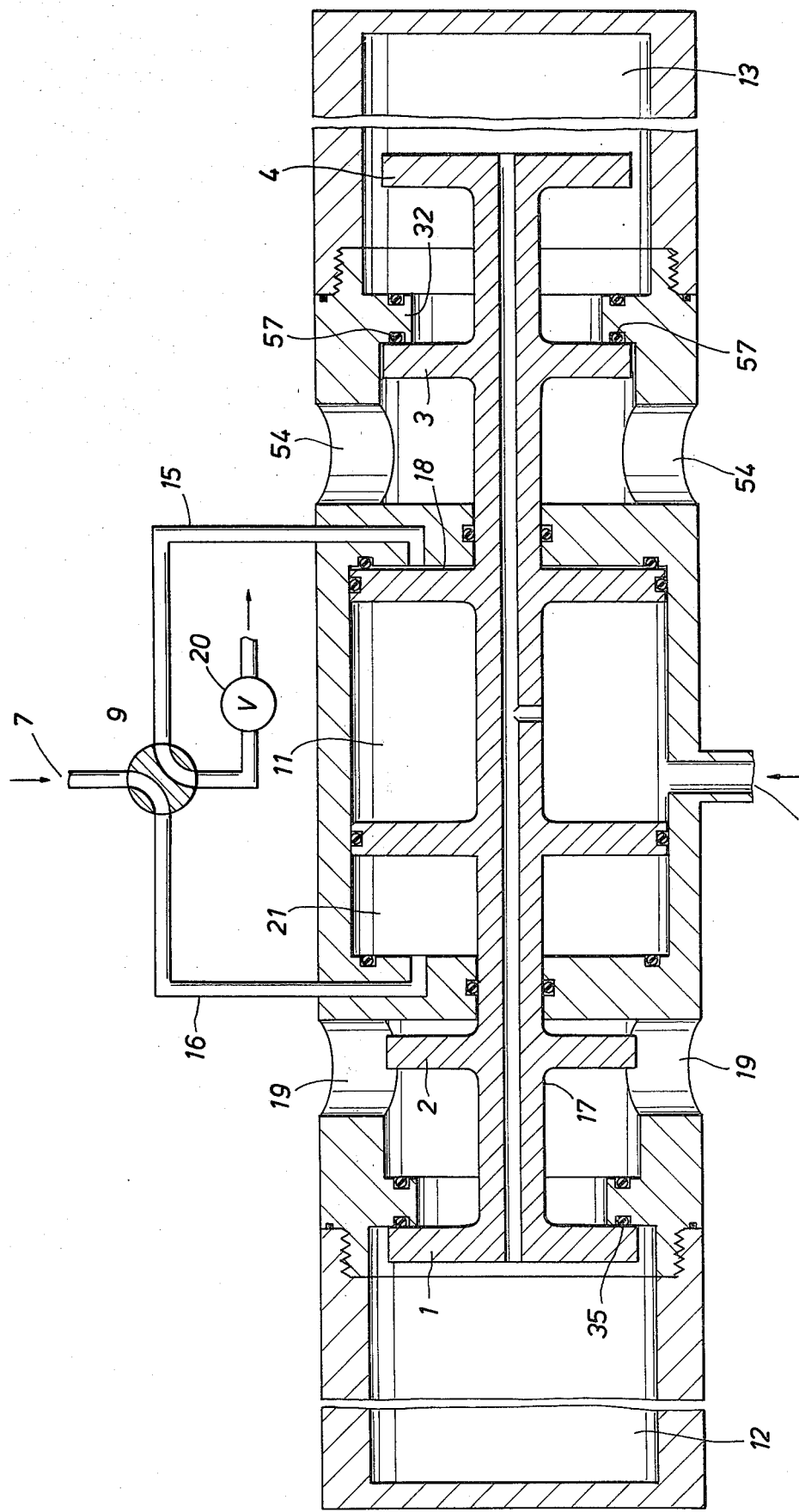
FIG. 2 is similar to FIG. 1 and shows the device after firing and with the shuttle at the right end of its stroke.

By turning the fourway valve 9 to the position shown in FIG. 2, the gas in volume 18 is released through valve 9 and throttle valve 20 into an area of reduced pressure, e.g., the surrounding water. Simultaneously, control gas enters volume 21 through gas inlet 7, fourway valve 9, and control gas line 16. The gas entering volume 21 tends to push the shuttle towards the right therefore lifting pistons 2 and 4 from their seals and fires the gun by allowing the pressurized gas in the pressure chambers to escape through their respective exhaust ports.

When the shuttle 17 reaches the other end of its stroke, as shown in FIG. 2, outer sealing piston 1 will seat against its seal 35 and piston 3 will seat against its seal 57 in shoulder 32. When the pressures of gas volumes 11, 12, and 13 equilibriate and reach their maximum, the device is again ready to fire.

It should be understood that the foregoing disclosure and description are only illustrative and explanatory of the invention. Various changes in size, shape, materials of construction, and configuration as well as in the details of the illustrated construction may be made within the scope of the appended claims without departing from the spirit of the invention.

I claim:

1. Apparatus suitable for producing a shock wave in a liquid, comprising:
    first and second gas storage means disposed at opposite ends of a shuttle and capable of being sealed by pistons mounted on said shuttle, and
    a single shuttle means moveable through a stroke and having sealing pistons thereon capable of simultaneously sealing gas in both first and second gas storage means at each end of the stroke and releasing said stored gas through exhaust port means during the stroke and thereby produce said shock wave, and
    control means for moving said shuttle means through said stroke, and
    a high pressure gas source for providing gas to the first and second gas storage means.

2. The apparatus of claim 1 wherein the first and second gas storage means are detachable.

3. The apparatus of claim 1 wherein the control means comprise two substantially circular control pistons having inner and outer faces and mounted concentrically on the shuttle situated within a central housing; the central housing having two control gas inlets and a gas charge inlet; said two control gas inlets disposed to alternately allow control gas responsive to valving means into the control housing against one of the control pistons; said gas charge inlet disposed to maintain pressure against the control pistons opposite the sides of the pistons to which the control gas is applied, and valving means adapted to alternately feed control gas to one control gas inlet while venting the other.

4. The apparatus of claim 3 wherein the valving means is a fourway valve.

5. The apparatus of claim 4 wherein the valving means also includes a throttle valve adapted to throttle the control gas as it vents.

6. Apparatus suitable for producing a shock wave in a liquid, comprising:
first and second detachable gas storage means for storing a gas charge and disposed at opposite ends of a shuttle having a center shaft capable of being sealed by pistons mounted on said center shaft, and
a single shuttle means moveable through a stroke, and having sealing pistons thereon capable of simultaneously sealing said gas charge in both first and second gas storage means at each end of the stroke and releasing said stored gas charge through exhaust port means during the stroke and thereby produce said shock wave, and
control means for moving said shuttle means through said stroke.

7. The apparatus of claim 6 wherein the shuttle central shaft has a passageway through its axis adapted to permit said gas charge into the first and second gas storage means.

8. The apparatus of claim 7 wherein the control means comprise two substantially circular control pistons having inner and outer faces and mounted concentrically about the central shaft and situated within a central housing; the central housing having two control gas inlets and a gas charge inlet; said two control gas inlets disposed to alternately allow control gas responsive to valving means into the control housing against one of the control pistons; said gas charge inlet disposed to maintain pressure against the control pistons opposite the sides of the control pistons to which the control gas is applied, and valving means adapted to alternately feed control gas to one control gas inlet while venting the other.

9. The apparatus of claim 8 wherein the valving means is a four way valve.

10. The apparatus of claim 9 wherein the valving means includes a throttle valve adapted to throttle the control gas as it vents.

11. Pneumatic apparatus suitable for producing a shock wave in a liquid, comprising:
a shuttle movable through a stroke having a central shuttle shaft with an axis;
first and second outer sealing pistons mounted axially on the shaft proximate to its opposite ends and each of the first and second outer sealing pistons having an inner face; and
first and second inner sealing pistons mounted axially on the shuttle shaft respectively adjacent and interior to the first and second outer sealing pistons and each of the first and second inner sealing pistons having an outer face; and
first and second control pistons mounted axially on the shaft, respectively adjacent and interior to the first and second inner sealing pistons, each of the first and second control pistons having an outer face, being an equal distance from the midpoint of the shuttle shaft, substantially round and of the same diameter, and
the pistons being spaced on the shuttle shaft such that the distance between the inner face of the first outer sealing piston and the outer face of the first inner sealing piston, the inner face of the second outer sealing piston and the outer face of the second inner sealing piston, and the outer face of the first control piston and the outer face of the second control piston are all essentially the same stroke length, and
a gas passage running the axial length of the shuttle shaft, and
a passage located in the shaft between first and second control pistons connecting the outside of the shuttle shaft with the gas passage; and
a first gas storage means mounted about the axis formed by the shuttle shaft at the first end of a control chamber means and disposed about the first outer sealing piston and the first inner sealing piston and having a first gas chamber with walls, an outer end, terminated at an inner end by a first shoulder, and disposed about the first outer sealing piston, and
a first shoulder having an outer sealing face adapted to substantially seal against the inner face of the first outer sealing piston, an inner sealing face adapted to substantially seal against the outer face of the first inner sealing piston, and an opening about the axis of the shuttle shaft larger than the shuttle shaft, and
first exhaust port means located between the first shoulder and the first end of a control chamber;
a second gas storage means mounted about the axis formed by the shuttle shaft at the second end of the control chamber means and disposed about the second outer sealing piston and the second inner sealing piston having
a second gas chamber with walls, an outer end, terminated at an inner end by a second shoulder, and disposed about the second outer sealing piston, and
a second shoulder having an outer sealing face adapted to substantially seal against the inner face of the second outer sealing piston, an inner sealing face adapted to substantially seal against the outer face of the second inner sealing piston, and an opening about the axis of the shuttle shaft larger than the shuttle shaft, and
second exhaust port means located between the second shoulder and the second end of the control chamber;
a control chamber having
an interior wall substantially circular, parallel to the axis of the shuttle shaft, adapted to fit the first and second control pistons, and having a gas charge inlet in a mid portion of the wall, and
a first end having openly terminated therein a first control gas line, a hole adapted for the axial passage of the shuttle shaft between first control piston and first inner sealing piston, gas sealing means in said hole substantially preventing the passage of gas through the hole, and
a second end having openly terminated therein a second control gas line, a hole adapted for the axial passage of the shuttle shaft between second control piston and second inner sealing piston, gas sealing means in said hold substantially preventing the passage of gas through the hole, and control valve means capable of alternately directing a pressurized gas through the first control gas line while simultaneously venting gas from the second control gas line or directing a pressurized gas through the second control gas line which simultaneously venting gas from the first control gas line.

12. The apparatus of claim 11 wherein gas sealing means are incorporated at the first and second ends in the control chamber.

13. The apparatus of claim 11 wherein gas sealing means are incorporated in the edges of the first and second control pistons.

14. The apparatus of claim 13 wherein the gas sealing means comprise expansion rings.

15. The apparatus of claim 11 wherein the control valve means additionally contain a throttle valve capable of controlling the gas escaping from alternately the first and second control gas line.

16. The apparatus of claim 11 wherein first and second shoulders have sealing means disposed in their inner and outer sealing faces.

17. The apparatus of claim 12 or 13 or 16 wherein the gas sealing means comprise "O" rings.

18. The apparatus of claim 11 wherein the first and second inner sealing pistons are substantially round with the edges concentric about the shuttle shaft and each of the first and second gas storage means additionally incorporates a bore adjacent to the respective inner sealing faces of the first and second shoulders and adapted to fit closely about the respective outer edges of the first and second inner sealing piston, whereby said bores function as a dashpot during the shuttle stroke.

19. The apparatus of claim 11 wherein the first and second gas chambers are removeably attached.

* * * * *